G. LOCKHART.
AUTOMOBILE SIGNAL.
APPLICATION FILED APR. 3, 1919.

1,389,673.

Patented Sept. 6, 1921.

INVENTOR
George Lockhart
BY
*Clarence Phelps Marr*
ATTORNEY

UNITED STATES PATENT OFFICE.

GEORGE LOCKHART, OF NEW YORK, N. Y.

AUTOMOBILE-SIGNAL.

1,389,673.  Specification of Letters Patent.  Patented Sept. 6, 1921.

Application filed April 3, 1919. Serial No. 287,294.

*To all whom it may concern:*

Be it known that I, GEORGE LOCKHART, a citizen of the United States, and resident of the borough of Manhattan, county, city, and State of New York, have invented certain new and useful Improvements in Automobile-Signals, of which the following is a specification.

This invention relates to improvements in vehicle stop signals and is particularly adapted for use in close quarters in order to notify persons approaching the vehicle from the rear of the intention of the driver to stop.

Another object of the invention is to provide a device which may be readily attached to the ordinary type of motor vehicle without materially changing the same.

Still another object of the invention resides in the provision of a device which is operable upon the application of the brake of the vehicle so that the device is practically automatic.

The following is what I consider a good means of carrying out this invention and the accompanying drawings should be referred to for a complete understanding of the specification which follows.

In the drawings:—

Similar reference numerals indicate like parts in all of the figures where they appear.

Figure 1:
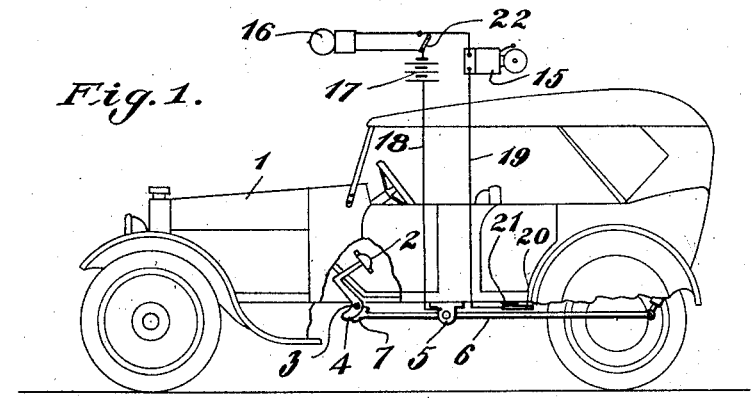
Figure 1, is a side view of a motor vehicle showing portions of the same broken away and illustrating this device as applied thereto.
Figure 2:
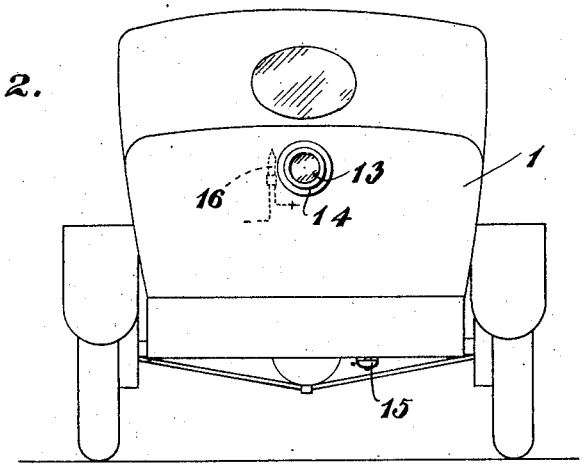
Fig. 2, is a rear view on an enlarged scale of a motor vehicle illustrating the device as attached thereto.

Referring to the drawings in detail the numeral 1 indicates a motor vehicle of the ordinary type having the usual brake pedal 2 for controlling the application of the brakes and this pedal is mounted on the rockable shaft 3 which forms the pivot of the same.

Formed on the pedal lever and extending downwardly therefrom is a cam 4 for controlling the movement of the target actuating mechanism to be more fully described.

Secured to the under side of the vehicle is a bracket 5 in which is pivoted a rockable lever 6, the forward end of which is formed with a head 7 for contact with the cam 4 and it will thus be seen that when the pedal 2 is moved in a direction to apply the brake, the cam will rock the shaft 6 thus causing its rear end to move upwardly.

Figure 3:
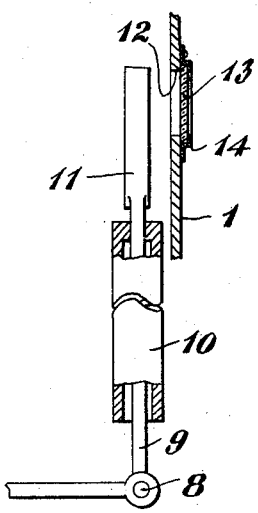
Fig. 3, is a fragmentary sectional view through a part of the rear of the vehicle illustrating in detail the construction of the target and guide therefor.

Pivotally connected at 8 to the rear end of the lever 6 is a push rod 9 which is slidably mounted in a tubular guide member 10 which in turn is secured between the rear wall of the vehicle and the upholstering thereof. The upper end of the push rod carries a target 11 which may be colored in any desired manner so as to be readily distinguishable through the opening 12 formed in the rear wall of the vehicle. This target is best illustrated in Fig. 3 and has its exposed face painted or otherwise colored so that the upper half of said target will match the color of the vehicle on which the device is used while the lower half will be preferably red or some contrasting color in order to be readily distinguishable. As illustrated in the drawing the opening is covered by a transparent screen or glass 13 which is secured as at 14 to the vehicle.

In order to produce an audible signal in connection with the visual signal, a bell 15 is provided, which is connected in series with a light 16 to a battery 17. The opposite terminal of the battery is connected by means of a wire 18 to the bracket 5 and connected to the terminal of the bell, opposite that which is connected with the light, is a wire 19 leading to a contact spring 20 mounted on an insulating block 21 attached to the under side of the car 1. It will be understood that the block 21 and spring 20 are arranged in the path of the lever 6 so that when the rear end of the lever is moved upwardly to display the target, the bell 15 will ring while the light 16 will illuminate the target.

It will be understood that the light may be rendered inoperative in daylight by closing the switch 22 and permitting the current to flow from the battery directly to the bell.

It will be understood that the target is arranged in such a manner that its upper half is of a color like that of the car while the lower half is preferably red or some contrasting color.

From the foregoing it will be evident that the movement of the pedal 2 to apply the brake will rock the lever 6 in the bracket 5 thus causing its rear end to exert upward pressure on the rod 9 and move the target upwardly into such a position that the lower half may be readily seen through the opening 12 this indicating to a party approaching the vehicle from the rear of the user's intention to stop, or reduce speed.

Other modifications may be made within the scope of the appended claims without departing from the principle or sacrificing the advantages of the invention.

What I claim is:

1. The combination with a motor vehicle, a brake lever for controlling the brake of said vehicle and a cam on said brake lever, of a bracket secured to the underside of the vehicle, a lever rockably mounted in said bracket, means on the lever for coöperation with the cam whereby when the brake lever is operated the lever will be rocked and means controlled by the movement of the lever to indicate the intention of the operator of the vehicle to stop.

2. The combination with a motor vehicle, a brake lever for controlling the brake of said vehicle and a cam on said brake lever, of a bracket secured to the under side of the vehicle, a lever rockably mounted in said bracket, means on the lever for coöperation with the cam whereby when the brake lever is operated the lever will be rocked, a push rod connected with the lever and a target controlled by the movement of the push rod to indicate the intention of the operator of the vehicle to stop.

Signed at the city of New York, this 28th day of March, 1919.

GEORGE LOCKHART.